United States Patent [19]

Nago

[11] Patent Number: 6,038,225
[45] Date of Patent: Mar. 14, 2000

[54] COMMUNICATION SYSTEM CAPABLE OF SWITCHING BETWEEN FRAMES OF DIFFERING CONFIGURATION DURING COMMUNICATION, AND A CONTROL METHOD FOR THE SAME

[75] Inventor: Hidetada Nago, Yokohama, Japan

[73] Assignee: Canon Kabushiki Kaisha, Tokyo, Japan

[21] Appl. No.: 08/969,063

[22] Filed: Nov. 12, 1997

[30] Foreign Application Priority Data

Nov. 15, 1996 [JP] Japan ..................................... 8-321015
Oct. 31, 1997 [JP] Japan ..................................... 9-316528

[51] Int. Cl.⁷ ............................. H04J 1/00; H04J 3/00; H04J 3/16; H04J 3/22
[52] U.S. Cl. .......................... 370/343; 370/345; 370/465
[58] Field of Search ..................................... 370/321, 329, 370/330, 337, 465, 345, 343, 466, 467, 470, 474; 375/200, 201, 202

[56] References Cited

U.S. PATENT DOCUMENTS

| | | | |
|---|---|---|---|
| 5,063,587 | 11/1991 | Semasa et al. ............................. | 379/53 |
| 5,164,980 | 11/1992 | Bush et al. ................................. | 379/53 |
| 5,297,146 | 3/1994 | Ogawa .................................. | 370/110.1 |
| 5,359,644 | 10/1994 | Tanaka et al. ............................. | 379/96 |
| 5,513,183 | 4/1996 | Kay et al. ............................... | 370/95.3 |
| 5,870,391 | 2/1999 | Nago ....................................... | 370/330 |
| 5,903,618 | 5/1999 | Miyake et al. ........................... | 375/356 |

FOREIGN PATENT DOCUMENTS 8-163071  of 0000  Japan .

*Primary Examiner*—Douglas W. Olms
*Assistant Examiner*—David R Vincent
*Attorney, Agent, or Firm*—Fitzpatrick, Cella, Harper & Scinto

[57] ABSTRACT

In order to perform communication frame switching without cutting off data communication, a terminal which has received a real-time data communication connection request during communication using a data communication frame notifies the other party with which communication is being made of a communication frame change and information of the change timing via a control channel, and also notifies the terminal originating the real-time data communication connection request of the state of the frame being used via the control channel, and changes the communication frame. Further, following changing of the frame, the terminal notifies the terminal originating the real-time data communication connection request of confirmation of connection, and starts real-time data communication via real-time channels. Thus, frame switching can be performed without cutting off data communication.

90 Claims, 11 Drawing Sheets

FIG. 4

| CNT | LCCH | V1 | V2 | Data |

FIG. 5

| CNT | LCCH | Data |

FIG. 6

| PR | UW | ID | DA | Data | CRC |

FIG. 7

| PR | UW | ID | DA | BF | NF | CRC |

|    | T1 | T2 | T3 | T4 | T5 | T6 | T7 | T8 |
|----|----|----|----|----|----|----|----|----|
| F1 |    |    |    |    |    |    | ■  |    |
| F2 |    |    |    |    |    |    |    | ■  |
| F3 | ■  |    |    |    |    |    |    |    |
| F4 |    | ■  |    |    |    |    |    |    |
| F5 |    |    | ■  |    |    |    |    |    |
| F6 |    |    |    | ■  |    |    |    |    |
| F7 |    |    |    |    | ■  |    |    |    |
| F8 |    |    |    |    |    | ■  |    |    |

TERMINAL 1 ←→ TERMINAL 2

|    | T1 | T2 | T3 | T4 | T5 | T6 | T7 | T8 |
|----|----|----|----|----|----|----|----|----|
| F1 | ▨  |    |    |    |    |    | ■  |    |
| F2 |    | ▨  |    |    |    |    |    | ■  |
| F3 | ■  |    | ▨  |    |    |    |    |    |
| F4 |    | ■  |    | ▨  |    |    |    |    |
| F5 |    |    | ■  |    | ▨  |    |    |    |
| F6 |    |    |    | ■  |    | ▨  |    |    |
| F7 |    |    |    |    | ■  |    | ▨  |    |
| F8 |    |    |    |    |    | ■  |    | ▨  |

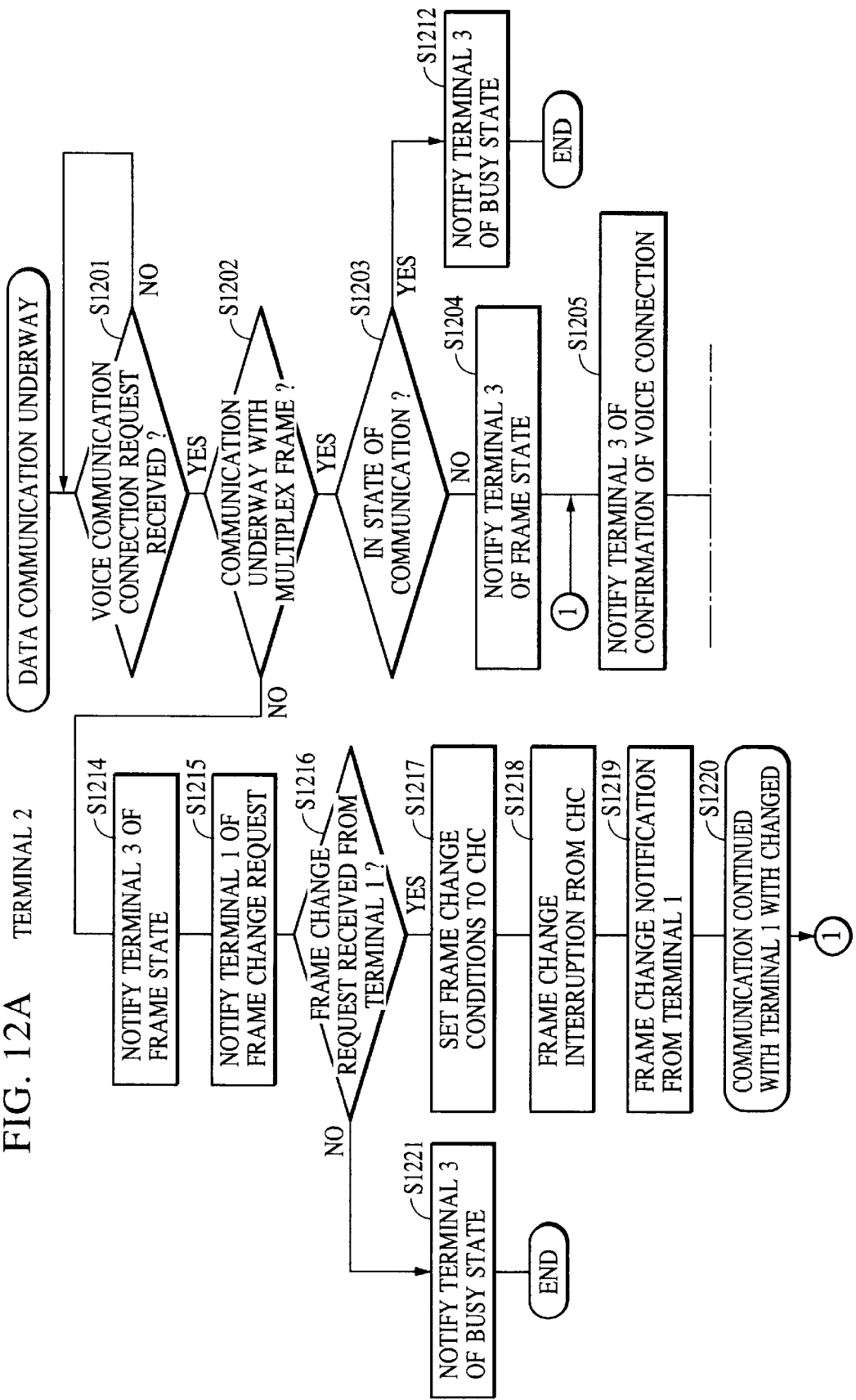

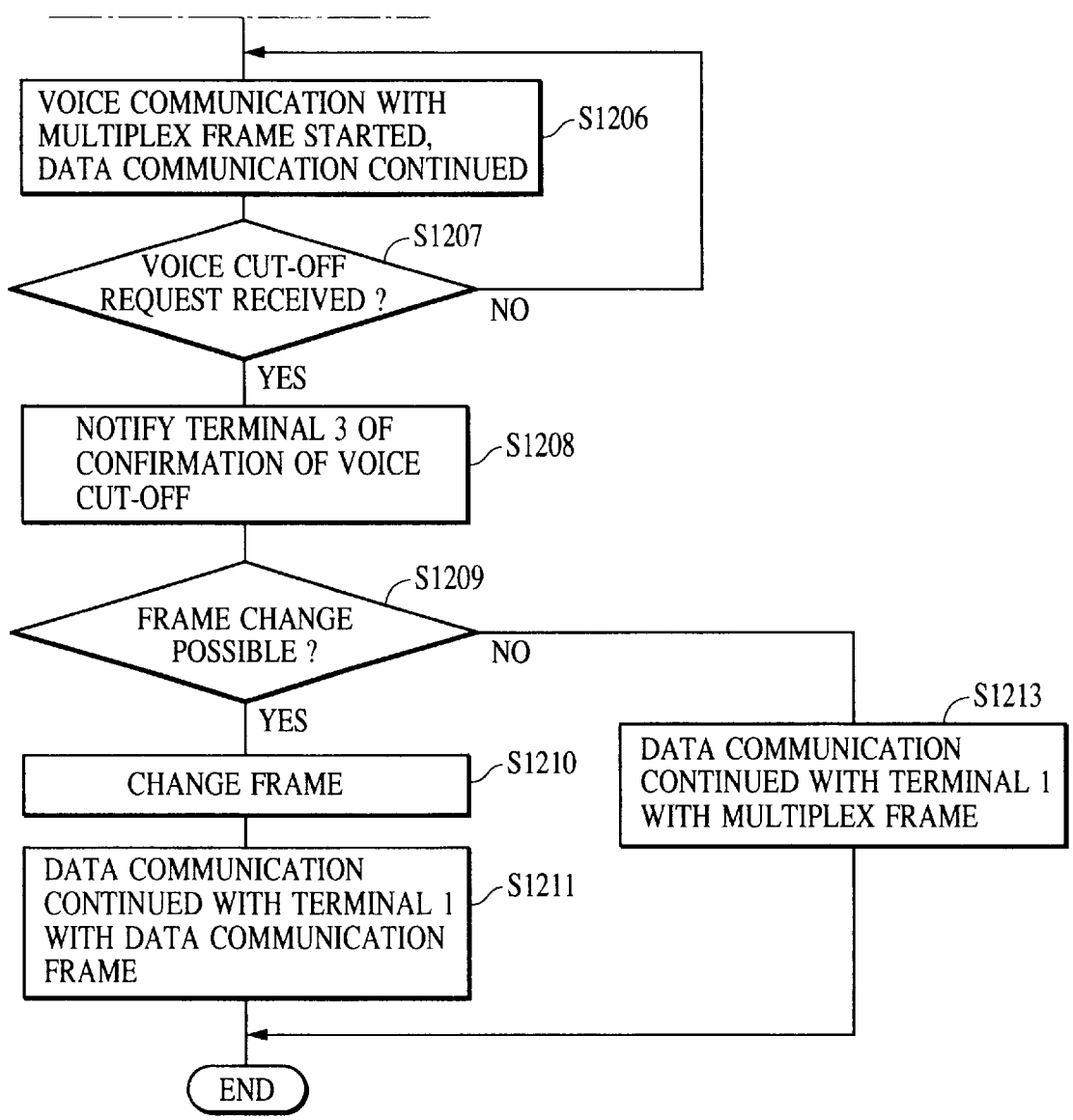

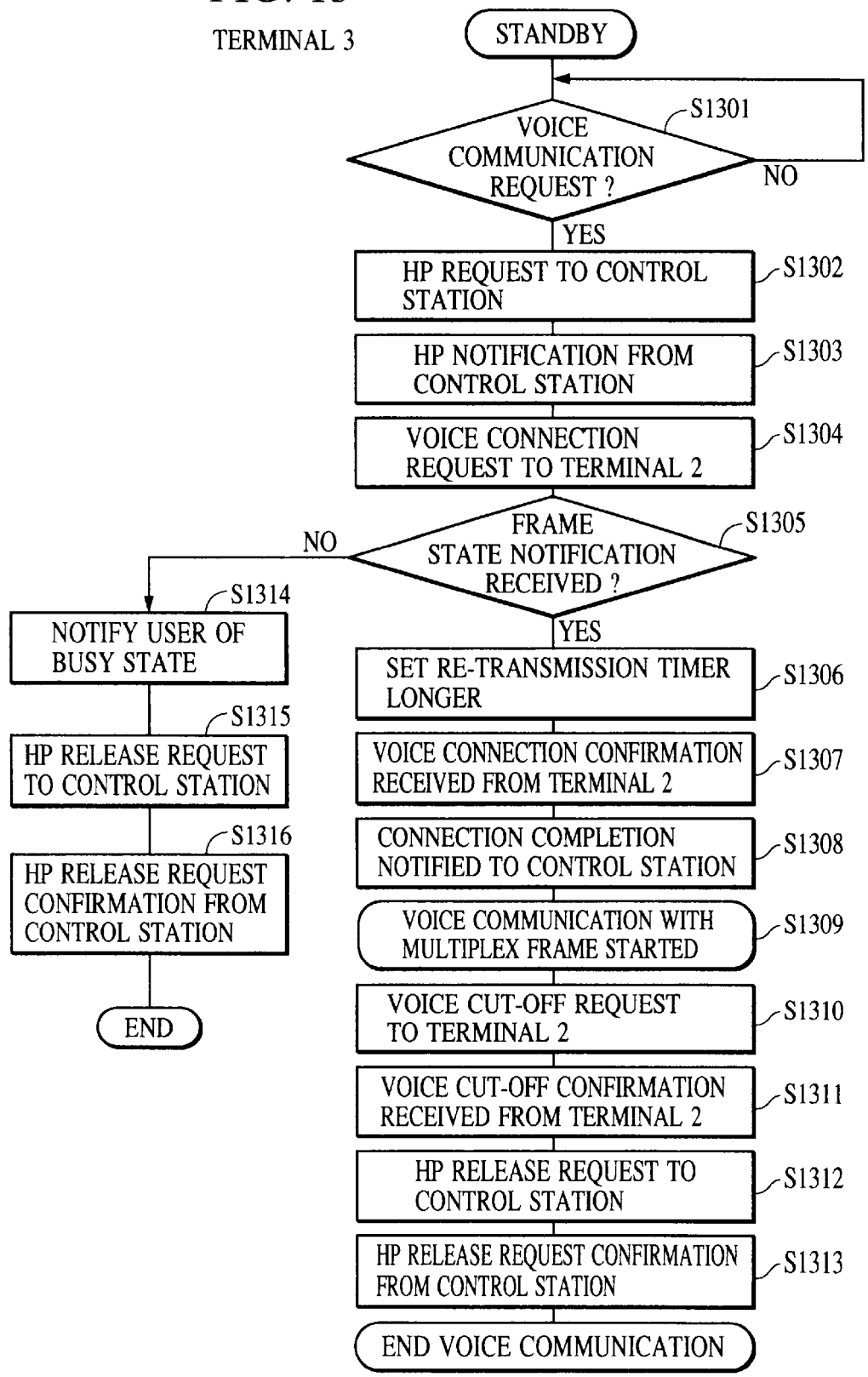

COMMUNICATION SYSTEM CAPABLE OF SWITCHING BETWEEN FRAMES OF DIFFERING CONFIGURATION DURING COMMUNICATION, AND A CONTROL METHOD FOR THE SAME

BACKGROUND OF THE INVENTION

1. Field of the Invention

The present invention relates to a communication system capable of switching between communication frames of differing configuration during communication, and a control method for the same.

2. Description of the Related Art

Regarding communication frames used by communication systems capable of performing communication of real-time data and non-real-time data simultaneously, there are known arrangements, comprising a CNT channel for synchronizing with frames, a LCCH channel for exchanging control information, a voice channel for sending and receiving real-time data, and a data channel for performing data communication. Such communication systems involve a terminal station transmitting a connection request to the other party with which communication is to be made, this request transmission being made using an LCCH channel, and subsequently performing voice or data communication.

On the other hand, there are known communication frames wherein the voice channel is done away with and all channels are made to be data channels, in order to increase the speed of data communication by however much.

Now, there has been a problem with terminals capable of communicating the above-described two types of frames wherein the two types of frames can be used within a single system, in that in the event one attempts to have the terminal with which communication is being conducted receive a voice frame using a communication frame that does not have a voice channel, the voice signal is not been able to be received thereby, since the communication frame being used does not have a voice channel.

SUMMARY OF THE INVENTION

Accordingly, it is an object of the present invention to provide a system wherein a plurality of communications each of differing routes can be performed even while a first communication is underway, by means of performing communication by switching between communication frames with differing configurations.

It is another object of the present invention to provide a frequency-hopping system capable of switching between communication frames with differing configurations while communication is underway.

It is yet another object of the present invention to provide a system wherein a terminal performing communication using a communication frame without a voice channel is capable of receiving voice communication.

It is still another object of the present invention to provide a system wherein voice communication can be started without cutting off data communication, in the event that a terminal performing communication using a communication frame without a voice channel is caused to receive voice communication.

It is a further object of the present invention to provide a system wherein switching between a communication frame which has both a voice channel and data channel and a communication frame which does not have a voice channel can be performed without cutting off communications.

These and other objects of the present invention will become apparent from the following description in the specification and the accompanying drawings.

BRIEF DESCRIPTION OF THE DRAWINGS

FIG. 4 is a configuration diagram of a multiplex communication frame used in the multiplex communication mode in an embodiment according to the present invention;

FIG. 5 is a configuration diagram of a data communication frame used in the data communication mode in an embodiment according to the present invention;

FIG. 6 is an internal configuration diagram of the LCCH, V1, V2, and Data channels of the communication frame in an embodiment according to the present invention;

FIG. 7 is an internal configuration diagram of the CNT channel of the communication frame in an embodiment according to the present invention;

FIG. 12, consisting of FIGS. 12A and 12B, is a flowchart illustrating the operation of a second terminal of an embodiment according to the present invention;

FIG. 13 is a flowchart illustrating the operation of a third terminal of an embodiment according to the present invention.

DESCRIPTION OF THE PREFERRED EMBODIMENT

Now, a description will be made regarding an embodiment of a communications system wherein a frequency-hopping method is used for performing communications.

Figure 1:
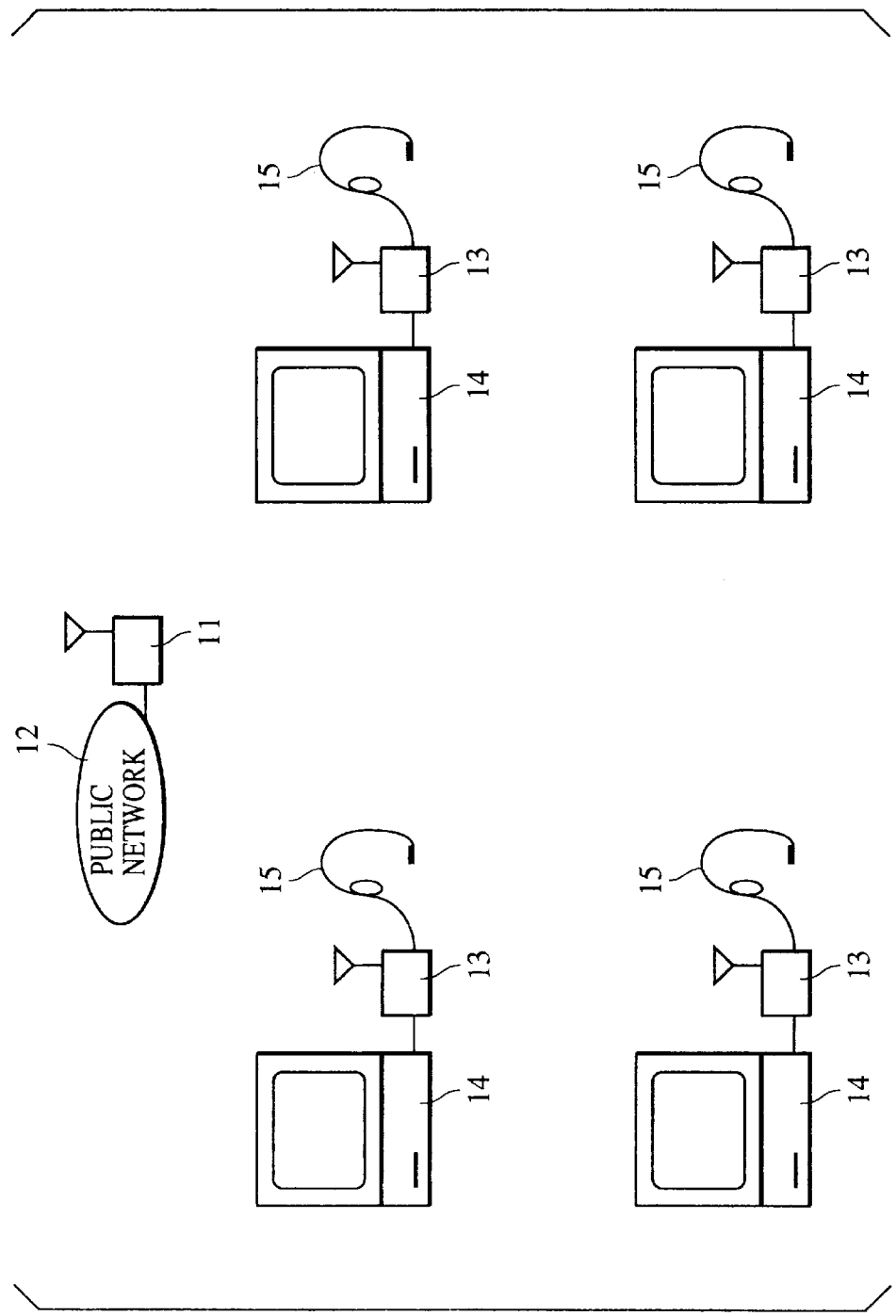
FIG. 1 is a system configuration diagram illustrating an embodiment according to the present invention.

With reference to the drawings, FIG. 1 is a system configuration diagram illustrating the present embodiment. In the Figure, reference numeral 11 denotes a frequency-hopping wireless device connected to a public network, reference numeral 12 denotes a public network, reference numeral 13 denotes frequency-hopping wireless devices connected to information equipment such as a computer, reference numeral 14 denotes information equipment such as a computer, and reference numeral 15 denotes voice input-output devices.

Figure 2:
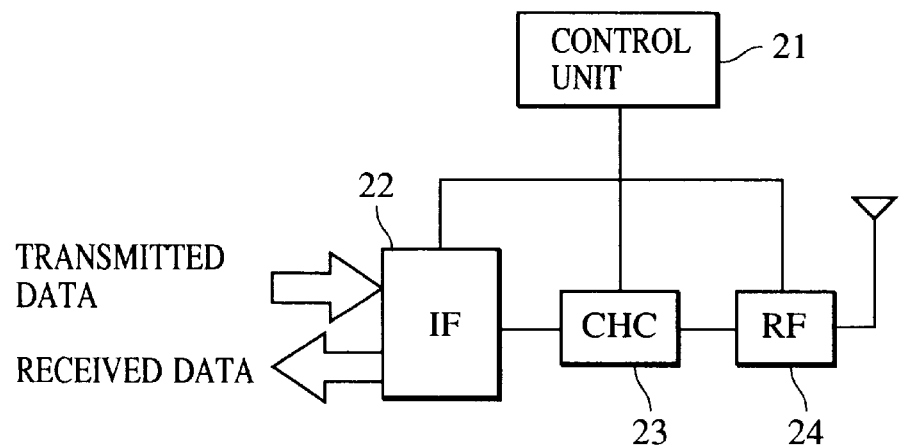
FIG. 2 is an internal block diagram of the frequency-hopping wireless device according to an embodiment according to the present invention.

FIG. 2 illustrates an internal block diagram of the frequency-hopping wireless device of the present embodiment. In the Figure, reference numeral 21 denotes a control unit for controlling the frequency-hopping wireless device, reference numeral 22 denotes an interface unit (IF) for exchanging received data and data to be transmitted with information equipment connected thereto, reference numeral 23 denotes a channel codec unit (CHC) for assembling transmission data to a wireless frame and also for extracting data from a received frame, and reference numeral 24 denotes a wireless unit (RF).

Figure 3:
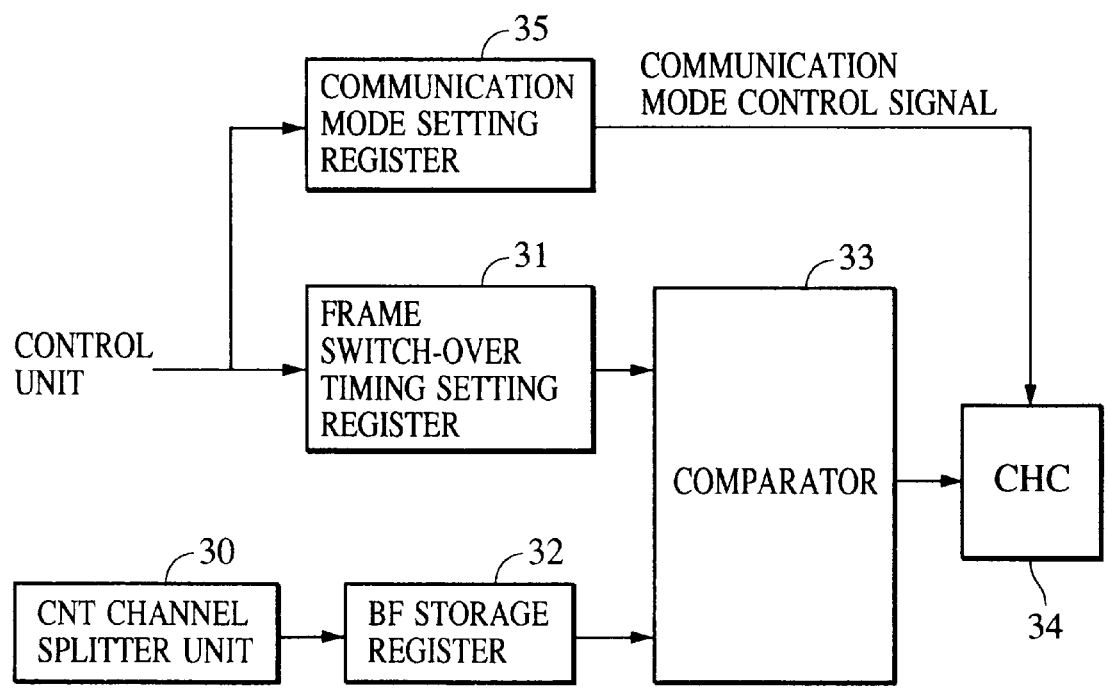
FIG. 3 is a block diagram of the frame switching circuit according to an embodiment according to the present invention.

Also, the channel codec unit 23 has a frame switching circuit for performing switching of frames, as shown in FIG. 3.

Further, the control unit 21 comprises a storage unit of RAM or the like for storing programs for controlling the frequency-hopping wireless device, and a microprocessor such as a CPU for reading the programs stored in the storage unit and performing various types of control based thereupon.

This frame switching circuit is comprised of a first register (frame switch-over timing setting register) 31 for storing change timing information for setting the switching timing of the communication frame from the control unit 21 of the communication terminal, a second register (BF storage register) 32 for storing system time information extracted from the CNT channel in a CNT channel splitter unit 30, a comparator 33 for detecting matching of the changed timing of the aforementioned first register 31 and the system time of the second register 32, a channel codec (CHC) 34 for performing frame switch-over by controlling the length of the channel based in the output of this comparator 33, and a register 35 for setting the communication mode (communication mode setting register).

In the above-described configuration, the control unit 21 responds to frame change requests exchanged in the LCCH channel, and based on the request, writes the time at which to change the frame in the first register 31 as change timing information. Subsequently, the value that the CNT channel splitter unit 30 has written to the second register 32 and the value written to the first register 31 are compared by the comparator 33, and in the event that the two values match, the control signal of the channel codec 34 to the timing circuit is changed.

This control signal changes the signal state from high to low, or from low to high, each time a frame switch-over occurs, thereby performing switching between multiplex communication frames and data communication frames.

The control unit 21 sets the communication mode to the register 35 for setting the communication mode. Comparison is made between the value that the CNT channel splitter unit 30 has written to the second register 32 and the value of the first register, and in the event that the values of the two registers match, the communication mode control signal sent to the channel codec unit 34 is changed. This communication mode control signal changes the signal state into the value of the communication mode setting register 35, each time frame switching occurs.

Figures 4, 5:
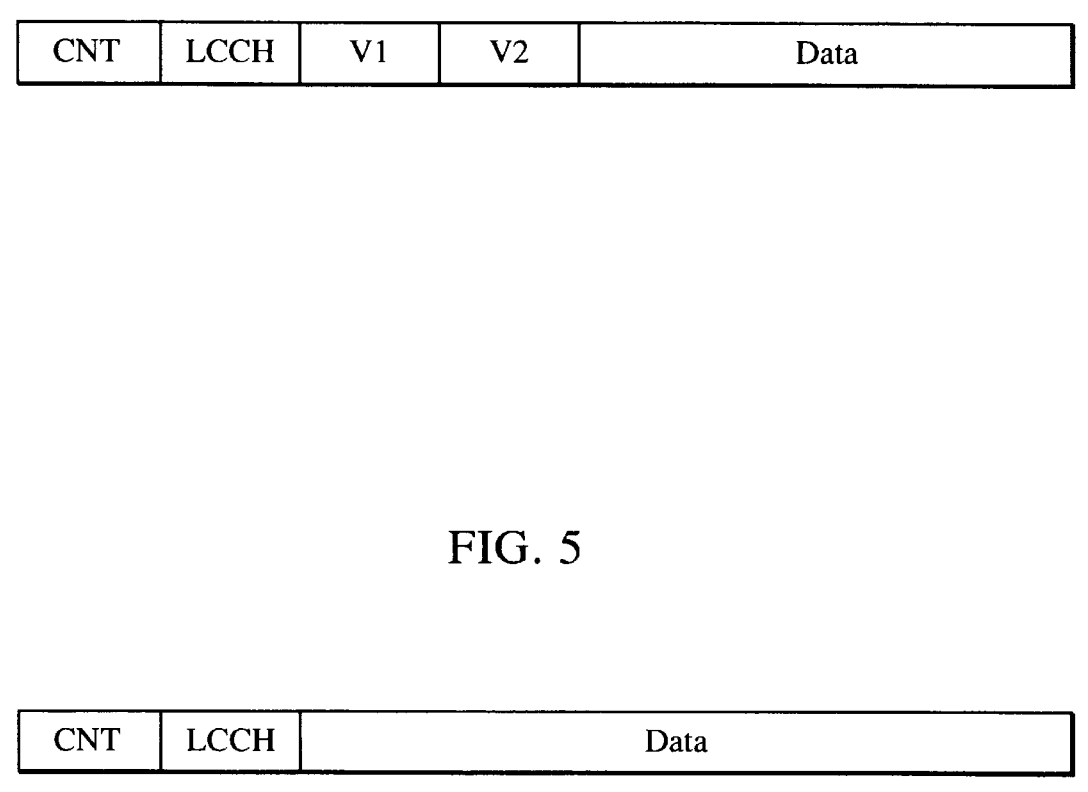

FIG. 4 is an explanatory diagram illustrating the configuration of a multiplex communication frame used in the multiplex communication mode having both voice and data channels according to the present embodiment. In the Figure, "CNT" is a channel for establishing frame synchronization and "LCCH" is a control channel used for communication control. V1 and V2 are channels used for communicating real-time data, with one being used as a receiving channel and the other used as a transmitting channel. "Data" is a data channel used for data communication.

FIG. 5 is a configuration diagram of a data communication frame without a voice channel used in the data communication mode according to the present embodiment. In the Figure, "CNT" is a channel for establishing frame synchronization and "LCCH" is a control channel used for communication control. "Data" is a data channel used for data communication.

Figures 6, 7:
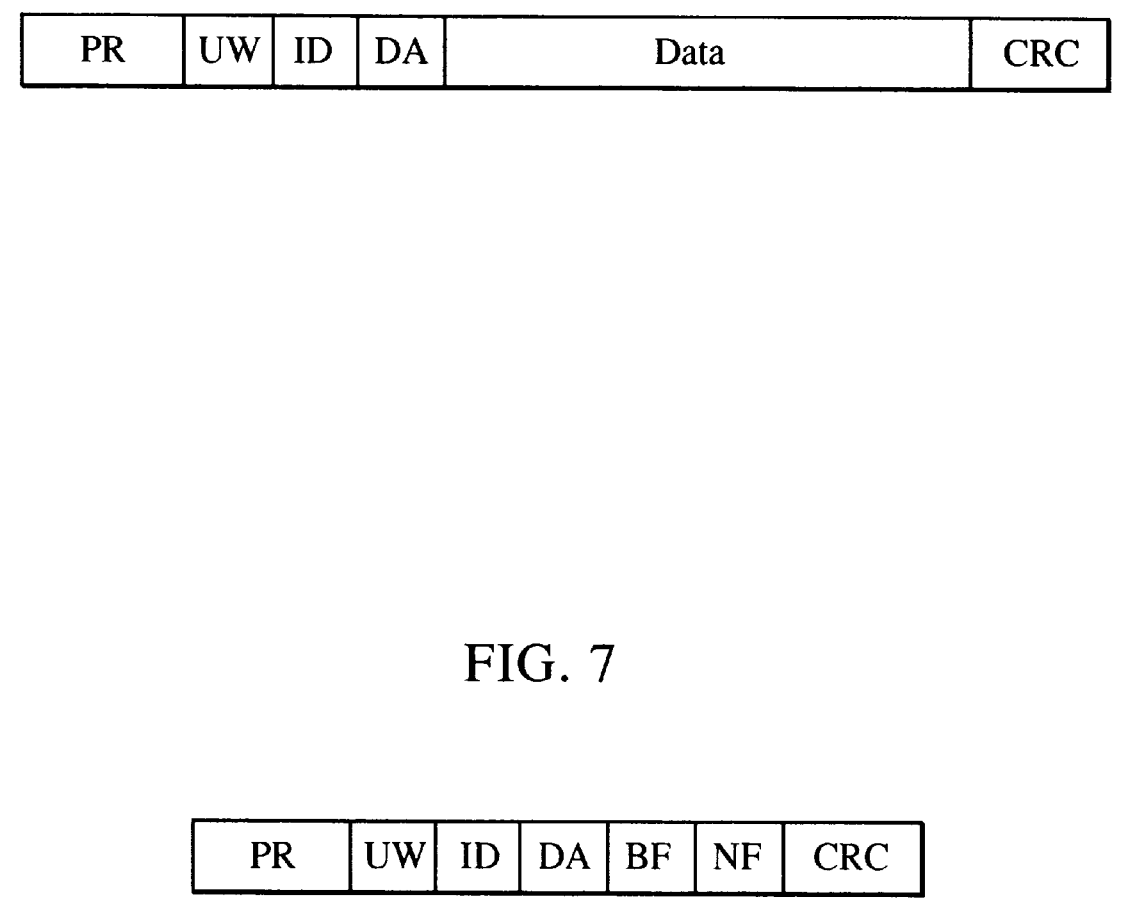

FIG. 6 is an internal configuration diagram of the above-described LCCH, V1, V2, and "Data" channels. In the Figure, PR is a preamble for securing bit synchronizing, and UW is a unique word used for splitting frames.

Also, ID is a number indicating a wireless terminal, and DA is a destination terminal number. "Data" is a portion for storing the data to be transmitted, and CRC is a portion for adding CRC parity. The data length differs according to the different channels LCCH, V1 and V2, and "Data".

FIG. 7 is an internal configuration diagram of the CNT channel of the aforementioned communication frame. In the Figure, PR is a preamble for securing bit synchronizing, and UW is a unique word used for splitting frames. ID is a number indicating a wireless terminal, and BF is time information within the system based on the hopping cycle of frequency hopping.

Further, NF is frequency information regarding the next hop, and CRC is a portion for adding CRC parity. Also, system synchronization is established by means of only the control station transmitting the CNT channel and other terminal receiving this CNT channel.

Figure 8:
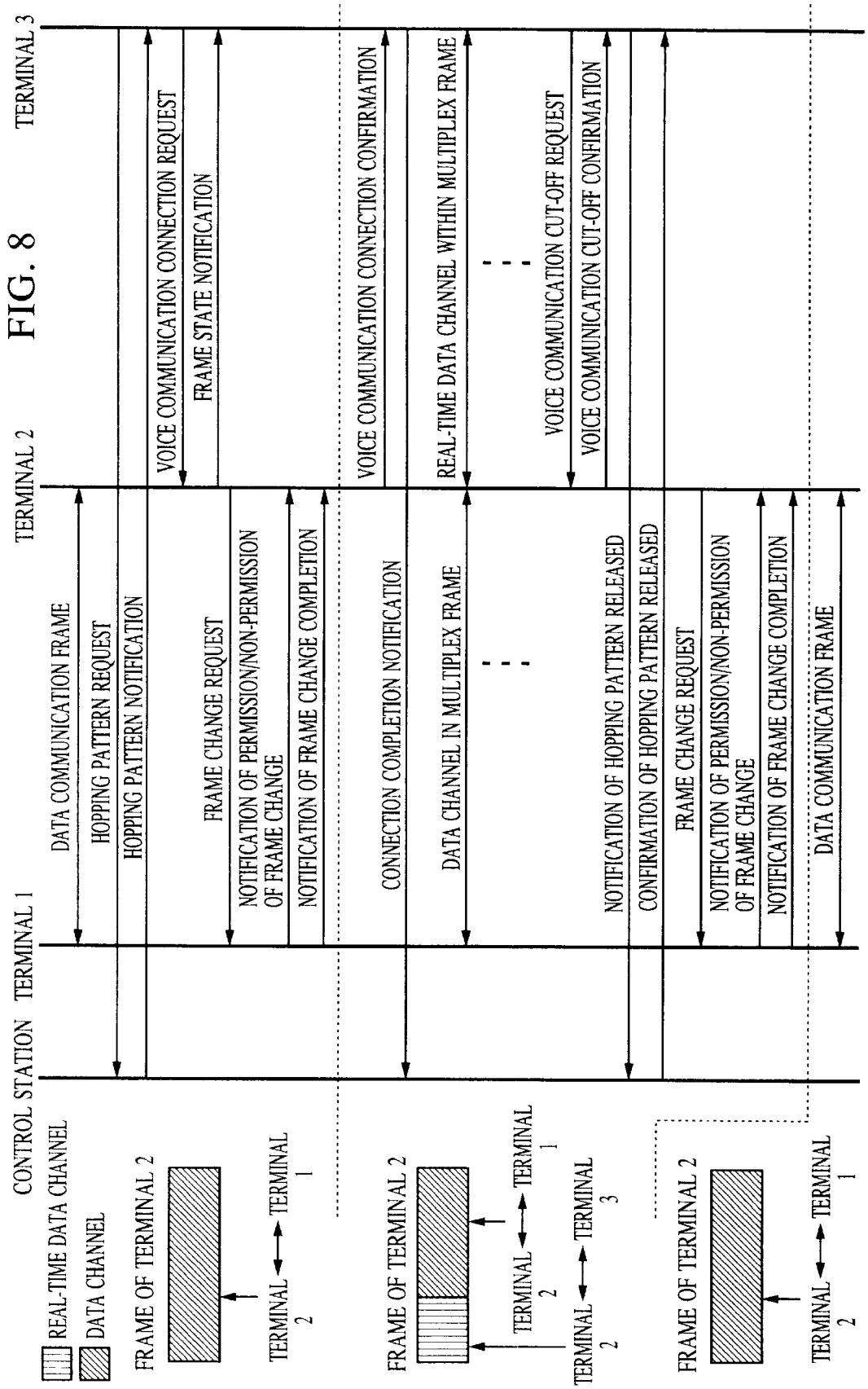
FIG. 8 is a sequence chart for switching between frames in an embodiment according to the present invention.

Next, FIG. 8 is an explanatory diagram illustrating the frame switching procedures within the communication system according to the present embodiment. In the Figure, the control procedures between the control station and each terminal are indicated to the right, and the frame selection states for each control procedure are indicated to the left.

Figure 9:
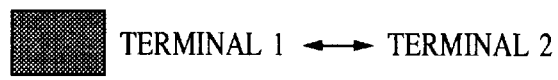
FIG. 9 illustrates an example of frequency hopping when in the data communication mode of an embodiment according to the present invention.
Figure 10:
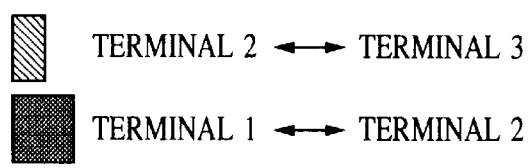
FIG. 10 illustrates an example of frequency hopping when in the multiplex communication mode of an embodiment according to the present invention.

FIG. 9 is an explanatory diagram illustrating an example of frequency hopping when in the data communication mode, and FIG. 10 is an explanatory diagram illustrating an example of frequency hopping when in the multiplex communication mode.

Figure 11:
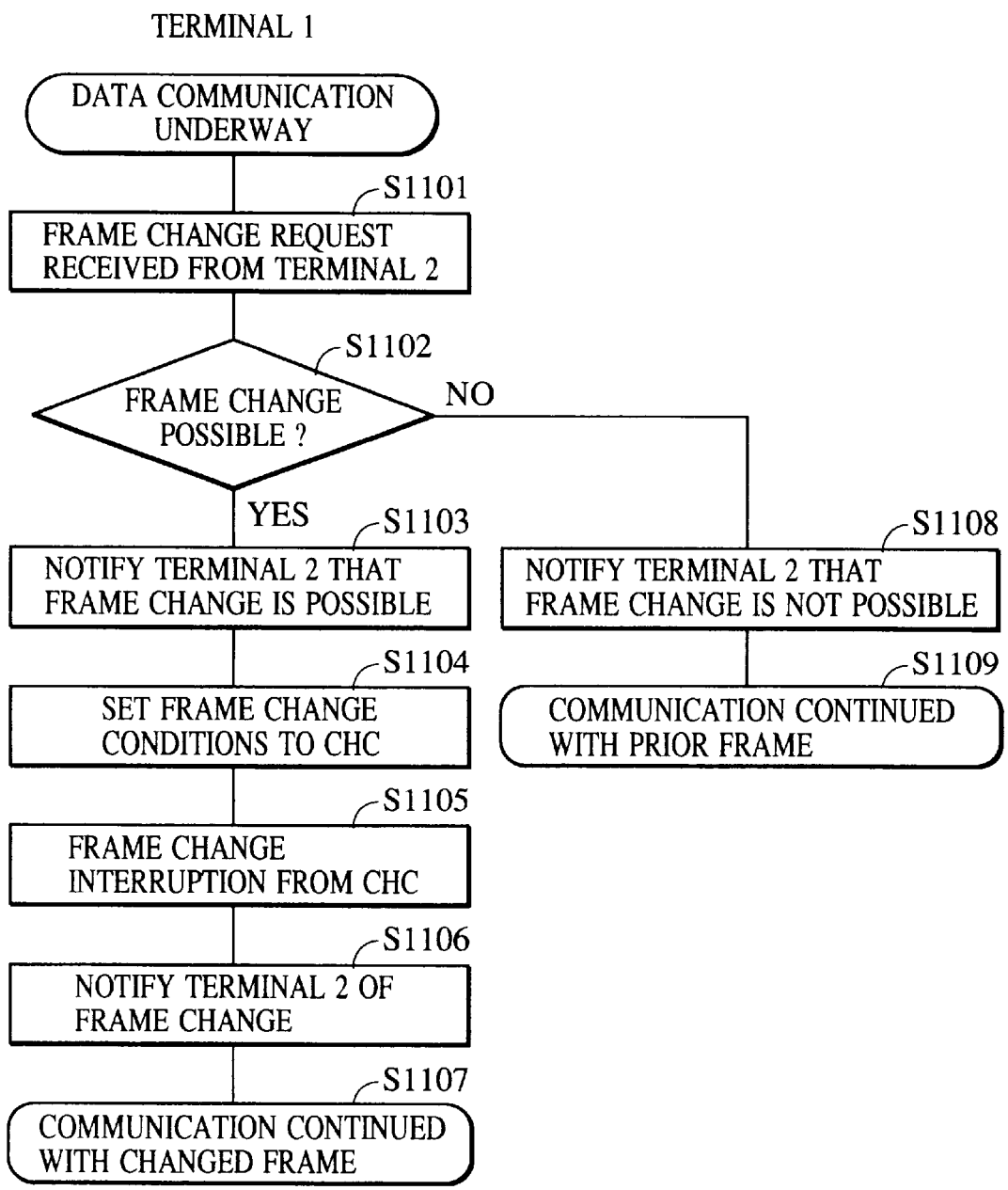
FIG. 11 is a flowchart illustrating the operation of a first terminal of an embodiment according to the present invention.

Further, FIG. 11 is a flowchart illustrating the frame switching operation performed by the control unit of a first terminal, FIG. 12 is a flowchart illustrating the frame switching operation performed by the control unit of a second terminal, and FIG. 13 is a flowchart illustrating the frame switching operation performed by the control unit of a third terminal.

Frame switching control according to the present embodiment will now be described with reference to FIG. 8 through FIG. 13. Description regarding the present embodiment will be made under the assumption that there exist a control station, a first terminal, a second terminal, and a third terminal.

Also regarding the system according to the present embodiment, real-time data is voice data, the data length of the LCCH channel is 24 bytes, the data length of the V channels is 80 bytes, the data length of the "Data" channel in the data communication mode is 1,072 bytes, the data length of the "Data" channel in the multiplex communication mode is 846 bytes, and each frame is 10 ms. Also, in the present system, the control channels, i.e., the CNT channel and LCCH channel, are allocated a hopping pattern which is common throughout the system, beforehand.

First, let us say that the first terminal and the second terminal are performing data communication in the data communication mode with a frequency hopping pattern illustrated in FIG. 9. Let us further say that, at this time, a need has arisen at the third terminal to perform voice communication with the second terminal (step S1301 in FIG. 13).

In such a case, first, the control unit of the third terminal uses the frequency hopping pattern allocated to the CNT channel and LCCH channel beforehand, and sends a frequency hopping pattern request to the control station via the LCCH channel to receive allocation of a frequency hopping pattern (HP) to use for voice communication (step S1302).

Following allocation of the frequency hopping pattern from the control station (step S1303), the control unit of the third terminal sends a voice communication connection request to the second terminal via the LCCH channel (step S1304).

The control unit of the second terminal, upon receiving the voice communication connection request (step S1201 in FIG. 12), judges whether the frame being used for communication with the first terminal is a data communication mode frame or a multiplex communication mode frame (step S1202).

If it is judged in step S1202 that the frame with which communication is being made is a data communication mode frame, there is the need to switch over to the multiplex communication mode frame in order to carry out voice communication with the third terminal. Also, communication cannot be carried out in the event that only the second terminal changes the frame, as a matter of course, so notification is made to the third terminal that the frame state is data communication mode (step S1214) and also a frame change request is sent to the first terminal (step S1215), via the LCCH channel, using the frequency hopping pattern allocated to the LCCH channel.

Upon receiving communication of this frame state (step S1305), the control unit of the third terminal waits for connection confirmation a longer time than normal (step S1306), since communication with the second terminal is started following the frame that the first terminal and second terminal use being changed.

Also, upon receiving the frame change request (step S1101 in FIG. 11), the control unit of the first terminal judges whether frame change is possible or not (step S1102), and in the event that frame change is not possible, the second terminal is notified of such (step S1108), and communication with the second terminal is continued (step S1109). Upon receiving notification that frame change is not possible (step S1216), the control unit of the second terminal notifies the third terminal that a voice connection cannot be made (i.e., busy) (step S1221). Also, in the event that frame change is possible, the control unit of the first terminal notifies the second terminal that frame change is possible (step S1103), following which the timing for switching the frame between the first terminal and second terminal is decided upon, and the frame is switched over. The timing for switching the frame is performed by means of the channel codec using the frequency hopping time under the control thereof, and by the switching time and the post-switching frame format being set to the frame switch-over timing register 31 within the channel coded, and by an interruption being generated for frame change (steps S1104, S1105, S1217, and S1218). Following switching, the control unit of the first terminal which has received an interruption from the channel codec transmits a notification to the second terminal that frame switching has been completed (step S1106), and communication with the second terminal is continued using the changed frame (step S1107). Upon receiving frame change notification from the first terminal (step S1219), the second terminal continues communication with the first terminal using the changed frame (step S1220), notifies the third terminal that the voice connection has been confirmed (step S1205), and starts voice communication between the second terminal and the third terminal using multiplex frame (step S1206). Data communication is continued between the first terminal and the second terminal using the multiplex communication mode "Data" channel even after the frame is switched over. Also, following confirmation of voice connection (step S1307), the control unit of the third terminal notifies the control station of the completed connection via the LCCH channel that connection has been completed (step S1308). Also, in the event that communication is already being carried out between the first terminal and the second terminal in step S1202, the third terminal is notified that a voice connection cannot be made (i.e., busy) in the event that the second terminal is conducting voice communication (steps S1203 and S1212). Upon receiving the notification that voice connection cannot be made (i.e., busy) at step S1305 (step S1314), the control unit of the third terminal sends a frequency hopping pattern (HP) release request to the control station using the LCCH channel (step S1315), and upon receiving frequency hopping pattern (HP) release confirmation from the control station, releases the voice communication frequency hopping pattern allocated (step S1316).

Also, if the control unit of the second terminal is performing communication with the first terminal using multiplex frame in step S1202, and in the event that this communication does not include voice communication, the switching procedures to the multiplex frame are not executed, and the third terminal is notified of confirmation of voice communication connection (steps S1203, S1204, and S1205).

When the control unit of the second terminal notifies the third terminal of confirmation of voice connection (step S1205) and the control unit of the third terminal receives confirmation of voice connection from the second terminal (step S1307), the third terminal sends the confirmation of voice communication connection to the control station (step S1308), and the second terminal and the third terminal perform voice communication using the V1 channel and the V2 channel (voice channels) of multiplex frame (step S1309).

Figure 14:
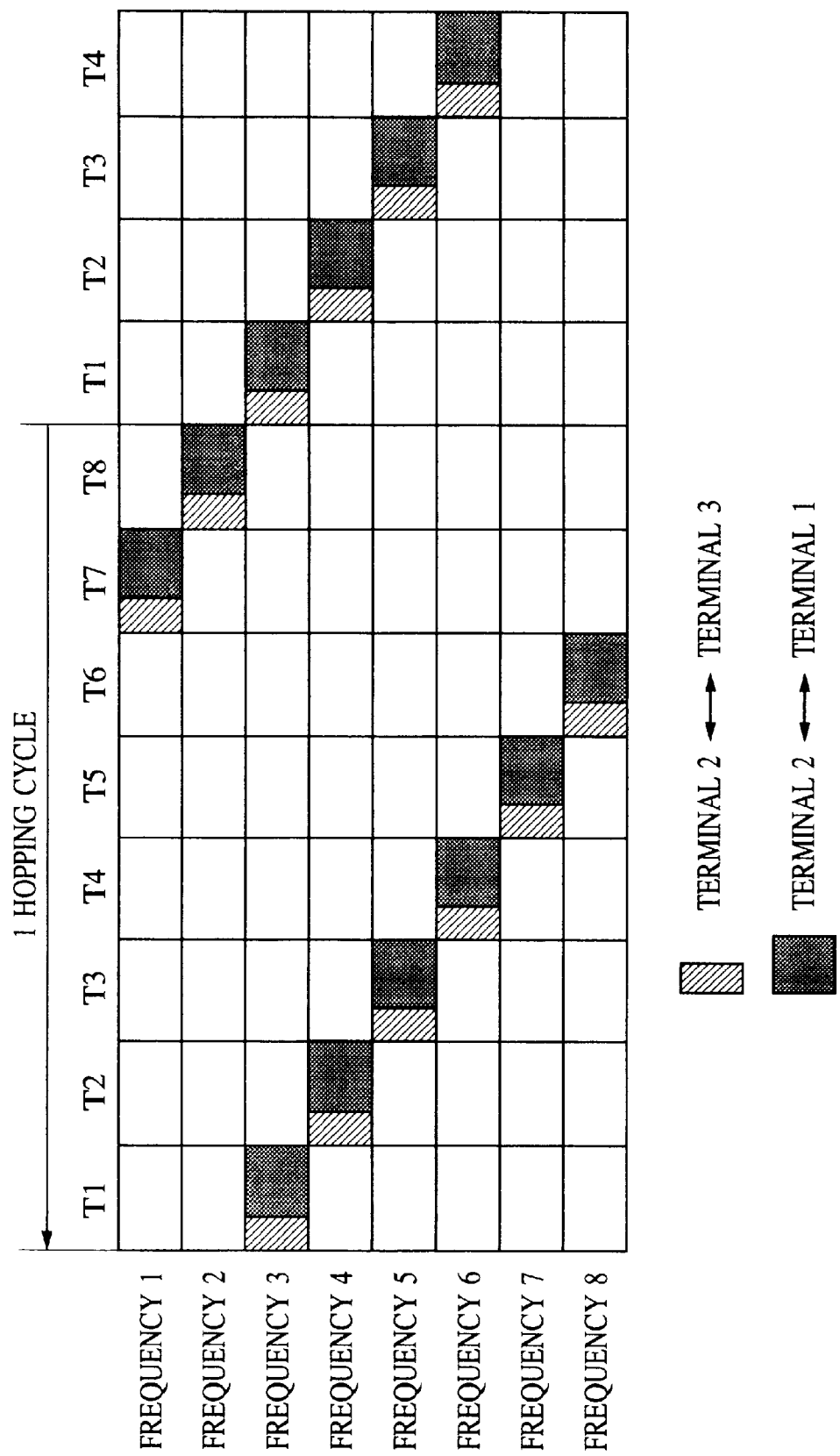
FIG. 14 illustrates an example of frequency hopping when in the multiplex communication mode of an embodiment according to the present invention.

In the event that differing frequency hopping patterns are to be used for the data communication between the first terminal and the second terminal, and the voice communication between the second terminal and the third terminal, communication is conducted as shown in FIG. 10. Also, in the event that the same frequency hopping pattern is to be used for the data communication between the first terminal and the second terminal, and the voice communication between the second terminal and the third terminal, communication is conducted as shown in FIG. 14.

Next, a description will be made regarding the communication frame switching procedures for when voice communication between the second terminal and the third terminal has been completed. When the voice communication between the second terminal and the third terminal is over, a voice communication cut-off request is sent from the control unit of the third terminal which is the calling device to the second terminal via the LCCH channel (step S1310). Upon receiving the voice communication cut-off request (step S1207), the control unit of the second terminal sends a voice communication cut-off confirmation to the third terminal via the LCCH channel (step S1208), thus ending voice communication.

Then, upon receiving the voice communication cut-off confirmation from the second terminal (step S1311), the control unit of the third terminal sends a hopping pattern release notification to the control station via the LCCH channel (step S1312), and following receiving a hopping pattern release confirmation from the control station (step S1313), the hopping pattern is released. At this time, the control unit of the second terminal checks whether or not frame switching from the multiplex communication mode to the data communication mode is possible (step S1209), and if possible, notifies the first terminal of a frame change request via the LCCH channel (step S1210). Upon receiving the frame change request, the control unit of the first terminal notifies the second terminal whether or not frame change is possible, in the same ways as the above description of the steps S1101 through S1109. In the event that the first terminal cannot perform frame change, such is notified to the second terminal and data communication is continued between the second terminal and the first terminal in multiplex frame (step S1213). In the event that frame change is possible, the control unit of the first terminal notifies the second terminal that frame change is possible, and subsequently, the first terminal and the second terminal determine the timing at which to perform switching, the frame is switched (step S1210), and data communication is continued in a data communication frame (step S1211).

Hence, switching of communication frames can be performed without interrupting data communication.

Incidentally, there are cases in which communication cannot be carried out between all wireless devices in a system, due to the positioning of the wireless devices. Since communication cannot be performed between such terminals, there is the need to receive from the system control station the address of another wireless device which is already been participating at the time at which subscription to the system was notified, check whether communication with each wireless device is possible, and record the results. There are two types of checking methods: a method wherein a wireless device uses an address received from the control station and attempts to call up the wireless device of the other party, and a method wherein the LCCH channel is monitored, the addresses of the transmitting wireless addresses are collected, and the wireless devices collected are considered to be capable of communication.

As described above, according to the present invention, a system can be provided wherein a terminal performing communication using a communication frame without a voice channel is capable of receiving voice communication.

Also, according to the present invention, switching of communication frames can be performed without cutting off data communication, thus enabling configuring an effective multimedia communications system using multiplex communication frames and data communication frames effectively.

What is claimed is:

1. A communication system comprising a first communication device, said first communication device comprising:

receiving means for, while a first communication is being performed between said first communication device and a second communication device using a first communication frame having a first configuration via a first communication path, receiving a communication request from a third communication device; and communication means, responsive to receipt of said communication request from said receiving means, for switching from communication using said first communication frame to communication using a second communication frame having a second configuration different from the first configuration so as to start a second communication between said first communication device and the second communication device using the second communication frame via the first communication path and so as to start a third communication between said first communication device and the third communication device using the second communication frame via a second communication path other than the first communication path.

2. A communication system according to claim 1, wherein said communication system further comprises judging means for determining whether communication is possible in regard to said communication request, in response to reception of said communication request from said receiving means.

3. A communication system according to claim 2, wherein said communication means starts the third communication with the third communication device based on a judgment of said judging means.

4. A communication system according to claim 2, wherein said communication means rejects communication with the third communication device based on the judgment of said judging means.

5. A communication system according to claim 1, wherein said second communication frame is a portion of said first communication frame which has been allocated to communication with the third communication device.

6. A communication system according to claim 5, wherein the first communication using the first communication frame is communication of non-real-time data, and the second and third communication using the second communication frame is multiplex communication of non-real-time data and real-time data.

7. A communication system according to claim 1, wherein said communication means performs communication via said first communication path and communication via said second communication path each as communications different parties.

8. A communication system according to claim 1, wherein said receiving means receives said communication request using a control channel for performing communication of control information.

9. A communication system according to claim 1, wherein said communication system performs communication in a wireless manner.

10. A communication system according to claim 9, wherein said communication system performs communication by means of a frequency-hopping system.

11. A communication device operable as a first communication device in a communication system, comprising:

receiving means for, while a first communication is being performed between said first communication device and a second communication device using a first communication frame having a first configuration via a first communication path, receiving a communication request from a third communication device; and communication means, responsive to receipt of said communication request from said receiving means, for switching from communication using said first communication frame to using a second communication frame having a second configuration different from the first configuration so as to start a second communication between said first communication device and the second communication device using the second communication frame via the first communication path and so as to start a third communication between said first communication device and the third communication device using the second communication frame via a second communication path other than the first communication path.

12. A communication device according to claim 11, wherein said first communication device further comprises a system connection to a judging means for determining whether communication is possible in regard to said communication request, in response to reception of said communication request from said receiving means.

13. A communication device according to claim 12, wherein said communication means starts the third communication with the third communication device based on a judgment of said judging means.

14. A communication device according to claim 12, wherein said communication means rejects communication with the third communication device based on a judgment of said judging means.

15. A communication device according to claim 11, wherein said second communication frame is a portion of said first communication frame which has been allocated to communication with the third communication device.

16. A communication device according to claim 15, wherein the first communication using the first communication frame is communication of non-real-time data, and the second and third communication using the second communication frame is multiplex communication of non-real-time data and real-time data.

17. A communication device according to claim 11, wherein said communication means performs communication via said first communication path and communication via said second communication path as communications with different parties.

18. A communication device according to claim 11, wherein said receiving means receives said communication request using a control channel for performing communication of control information.

19. A communication device according to claim 11, wherein said first communication device performs communication in a wireless manner.

20. A communication device according to claim 19, wherein said first communication device performs communication by means of a frequency-hopping system.

21. A communication system, including a first communication device, which uses a first communication frame for communicating between said first communication device and a second communication device, and which uses a second communication frame for communicating between said first communication device and the second communication device and between said first communication device and a third communication device, said communication system using frequency-hopping communication and comprising:
   receiving means for receiving switch-over requests for switching over to communication using said second communication frame during communication using said first communication frame;
   switching means for switching to communication using said second communication frame upon receipt of a switch-over request by said receiving means; and
   control means for controlling said system such that communication between said first communication device and the third communication device is started while communication between said first communication device is continued, using said second communication frame switched to by said switching means.

22. A communication system according to claim 21, wherein said receiving means receives said switch-over request from a communication device other than the second communication device.

23. A communication system according to claim 21, wherein said control means starts communication with the communication device which has sent said switch-over request.

24. A communication system according to claim 21, wherein said switching means sends information regarding a timing at which to switch over the communication frames to the communication device which is conducting communication using said second communication frame.

25. A communication system according to claim 24, wherein the information regarding the timing at which to switch over the communication frames is sent using a control channel for sending control information.

26. A communication system according to claim 21, wherein said receiving means receives said switch-over request using a control channel for communicating control information.

27. A communication system according to claim 21, wherein said second communication frame is a portion of said first communication frame which has been allocated to communication with the third communication device.

28. A communication system according to claim 27, wherein said first communication frame is a communication frame which includes a non-real-time data channel for communicating non-real-time data and does not include a real-time data channel, and wherein said second communication frame is a communication frame which includes a real-time data channel for communicating real-time data and a non-real-time data channel for communicating non-real-time data.

29. A communication device operable as a first communication device in a communication system, said first communication device using a first communication frame for communicating between said first communication device and a second communication device, and using a second communication frame for communicating between said first communication device and the second communication device and between said first communication device and a third communication device, said first communication device using frequency-hopping communication and comprising:
   receiving means for receiving switch-over requests for switching over to communication using said second communication frame during communication using said first communication frame;
   switching means for switching to communication using said second communication frame upon receipt of a switch-over request by said receiving means; and
   control means for controlling said first communication device such that communication between said first communication device and the third communication device is started while communication between said first communication device is continued, using said second communication frame switched to by said switching means.

30. A communication device according to claim 29, wherein said receiving means receives said switch-over request from a communication device other than the second communication device.

31. A communication device according to claim 29, wherein said control means starts communication with the communication device which has sent said switch-over request.

32. A communication device according to claim 29, wherein said switching means sends information regarding a timing at which to switch over the communication frames to the communication device which is conducting communication using said second communication frame.

33. A communication device according to claim 32, wherein the information regarding the timing at which to switch over the said communication frames is sent using a control channel for communicating control information.

34. A communication device according to claim 29, wherein said receiving means receives said switch-over request using a control channel for communicating control information.

35. A communication device according to claim 29, wherein said second communication frame is a portion of said first communication frame which has been allocated to communication with said second communication device.

36. A communication device according to claim 35, wherein said first communication frame is a communication frame which includes a non-real-time data channel for communicating non-real-time data and does not include a real-time data channel, and wherein said second communication frame is a communication frame which includes a real-time data channel for communicating real-time data and a non-real-time data channel for communicating non-real-time data.

37. A control method of a communication system comprising a first communication device, said method comprising the steps, in the first communication device, of:
    receiving, while a first communication is being performed between the first communication device and a second communication device using a first communication frame having a first configuration via a first communication path, a communication request from a third communication device; and
    controlling communication, responsive to receipt of said communication request in said receiving step, to switch from communication using the first communication frame to communication using a second communication frame having a second configuration different from the first configuration so as to start a second communication between the first communication device and the second communication device using the second communication frame via the first communication path and so as to start a third communication between the first communication device and the third communication device using the second communication frame via a second communication path other than the first communication path.

38. A control method of a communication system according to claim 37, wherein said control method further comprises a judging step for determining whether communication is possible in regard to said communication request, in response to said communication request in said receiving step.

39. A control method of a communication system according to claim 38, wherein said communication control step starts the third communication with the third communication device based on a judgment made in said judging step.

40. A control method of a communication system according to claim 38, wherein said communication control step rejects communication with the third communication device based on a judgment made in said judging step.

41. A control method of a communication system according to claim 37, wherein said second communication frame is a portion of said first communication frame which has been allocated to communication with the third communication device.

42. A control method of a communication system according to claim 41, wherein the second communication is communication of non-real-time data, and the third communication is multiplex communication of non-real-time data and real-time data.

43. A control method of a communication system according to claim 37, wherein said communication control step performs communication via said first communication path and communication via said second communication path as communications with different parties.

44. A control method of a communication system according to claim 37, wherein said receiving step receives said communication request using a control channel for performing communication of control information.

45. A control method of a communication system according to claim 37, wherein said control method performs communication in a wireless manner.

46. A control method of a communication system according to claim 45, wherein said control method performs communication by means of a frequency-hopping system.

47. A control method of a communication device operable as a first communication device in a communication system, said method comprising the steps of:
    receiving, while a first communication is being performed between the first communication device and a second communication device using a first communication frame having a first configuration via a first communication path, receiving a communication request from a third communication device; and
    controlling communication, responsive to receipt of said communication request in said receiving step, for switching from communication using said first communication frame to communication using a second communication frame having a second configuration different from the first configuration so as to start a second communication between the first communication device and the second communication device using the second communication frame via the first communication path and so as to start a third communication between the first communication device and the third communication device using the second communication frame via a second communication path other than the first communication path.

48. A control method of a communication device according to claim 47, wherein said control method further comprises a judging step for determining whether communication is possible in regard to said communication request, in response to said communication request in said receiving step.

49. A control method of a communication device according to claim 48, wherein said communication control step starts the third communication with the third communication device based on a judgment made in said judging step.

50. A control method of a communication device according to claim 48, wherein said communication control step rejects communication with the third communication device based on the judgment made in said judging step.

51. A control method of a communication device according to claim 47, wherein said second communication frame is a portion of said first communication frame which has been allocated to communication with the third communication device.

52. A control method of a communication device according to claim 51, wherein said first communication is communication of non-real-time data, and said second communication is multiplex communication of non-real-time data and real-time data.

53. A control method of a communication device according to claim 47, wherein said communication control step performs communication via said first communication path and communication via said second communication path each as communications with different parties.

54. A control method of a communication device according to claim 47, wherein said receiving step receives said communication request using a control channel for performing communication of control information.

55. A control method of a communication device according to claim 47, wherein said control method performs communication in a wireless manner.

56. A control method of a communication device according to claim 55, wherein said control method performs communication by means of a frequency-hopping system.

57. A method for controlling a communication system, including a first communication device, which uses a first communication frame for communicating between the first communication device and a second communication device, and which uses a second communication frame for communicating between the first communication device and the second communication device and between the first communication device and a third communication device, said method using frequency-hopping communication and comprising the steps of:
  receiving switch-over requests for switching over to communication using said second communication frame during communication using said first communication frame;
  switching to communication using said second communication frame upon receipt of a switch-over request in said receiving step; and
  controlling the system such that communication between the first communication device and the third communication device is started while communication between the first communication device is continued, using said second communication frame switched to by said switching step.

58. A method for controlling a communication system according to claim 57, wherein said receiving step receives said switch-over request from a communication device other than the second communication device.

59. A method for controlling a communication system according to claim 57, wherein said control step starts communication with the communication device which has sent said switch-over request.

60. A method for controlling a communication system according to claim 57, wherein said switching step sends information regarding a timing at which to switch over the communication frames to the communication device which is conducting communication using said second communication frame.

61. A method for controlling a communication system according to claim 60, wherein the information regarding the timing at which to switch over the said communication frames is sent using a control channel for communicating control information.

62. A method for controlling a communication system according to claim 57, wherein said receiving step receives said switch-over request using a control channel for communicating control information.

63. A method for controlling a communication system according to claim 57, wherein said second communication frame is a portion of said first communication frame which has been allocated to communication with the third communication device.

64. A method for controlling a communication system according to claim 63, wherein said first communication frame is a communication frame which includes a non-real-time data channel for communicating non-real-time data and does not include a real-time data channel, and wherein said second communication frame is a communication frame which includes a real-time data channel for communicating real-time data and a non-real-time data channel for communicating non-real-time data.

65. A method for controlling a communication device operable as a first communication device in a communication system, said method using a first communication frame for communicating between the first communication device and a second communication device, and using a second communication frame for communicating between the first communication device and the second communication device and between the first communication device and a third communication device, said method using frequency-hopping communication and comprising the steps, in the first communication device, of:
  receiving switch-over requests for switching over to communication using said second communication frame during communication using said first communication frame;
  switching to communication using said second communication frame upon receipt of a switch-over request in said receiving step; and
  controlling the first communication device such that communication between the first communication device and the third communication device is started while communication between the first communication device is continued, using said second communication frame switched to by said switching step.

66. A method for controlling a communication device according to claim 65, wherein said receiving step receives said switch-over request from a communication device other than the second communication device.

67. A method for controlling a communication device according to claim 65, wherein said control step starts communication with the communication device which has sent said switch-over request.

68. A method for controlling a communication device according to claim 65, wherein said switching step sends information regarding a timing at which to switch over the communication frames to the communication device which is conducting communication using said second communication frame.

69. A method for controlling a communication device according to claim 68, wherein the information regarding the timing at which to switch over the said communication frames is sent using a control channel for communicating control information.

70. A method for controlling a communication device according to claim 65, wherein said receiving step receives said switch-over request using a control channel for communicating control information.

71. A method for controlling a communication device according to claim 65, wherein said second communication frame is a portion of said first communication frame which as been allocated to communication with said second communication device.

72. A method for controlling a communication device according to claim 71, wherein said first communication frame is a communication frame which includes a non-real-time data channel for communicating non-real-time data and does not include a real-time data channel, and wherein said second communication frame is a communication frame which includes a real-time data channel for communicating real-time data and a non-real-time data channel for communicating non-real-time data.

73. A program storage device readable by a machine and tangibly embodying a program of instructions executable by the machine to perform a control method of a communication device operable as a first communication device in a communication system, said method comprising the steps of:

receiving, while a first communication is being performed between the first communication device and a second communication device using a first communication frame having a first configuration via a first communication path, receiving a communication request from a third communication device; and controlling communication, responsive to receipt of said communication request in said receiving step, for switching from communication using said first communication frame to communication using a second communication frame having a second configuration different from the first configuration so as to start a second communication between the first communication device and the second communication device using the second communication frame via the first communication path and so as to start a third communication between the first communication device and the third communication device using the second communication frame via a second communication path other than the first communication path.

74. A program storage device according to claim 73, wherein said control method further comprises a judging step for determining whether communication is possible in regard to said communication request, in response to said communication request in said receiving step.

75. A program storage device according to claim 74, wherein said communication control step starts the third communication with the third communication device based on a judgment made in said judging step.

76. A program storage device according to claim 74, wherein said communication control step rejects communication with the third communication device based on a judgment made in said judging step.

77. A program storage device according to claim 73, wherein said second communication frame is a portion of said first communication frame which has been allocated to communication with the third communication device.

78. A program storage device according to claim 77, wherein said first communication is communication of non-real-time data, and said second communication is multiplex communication of non-real-time data and real-time data.

79. A program storage device according to claim 73, wherein said communication control step performs communication via said first communication path and communication via said second communication path as communications with different parties.

80. A program storage device according to claim 73, wherein said receiving step receives said communication request using a control channel for performing communication of control information.

81. A program storage device according to claim 73, wherein said method performs communication in a wireless manner.

82. A program storage device according to claim 81, wherein said method performs communication by means of a frequency-hopping system.

83. A program storage device readable by a machine and tangibly embodying a program of instructions executable by the machine to perform a method for controlling a communication device operable as a first communication device in a communication system, said method communication frame for communicating between the first communication device and a second communication device, and using a second communication frame for communicating between the first communication device and the second communication device and between the first communication device and a third communication device, said method using frequency-hopping communication and comprising the steps, in the first communication device, of:

receiving switch-over requests for switching over to communication using said second communication frame during communication using said first communication frame;

switching to communication using said second communication frame upon receipt of a switch-over request in said receiving step; and controlling the first communication device such that communication between the first communication device and the third communication device is started while communication between the first communication device is continued, using said second communication frame switched to by said switching step.

84. A program storage device according to claim 83, wherein said receiving step receives said switch-over request from a communication device other than the second communication device.

85. A program storage device according to claim 83, wherein said control step starts communication with the communication device which has sent said switch-over request.

86. A program storage device according to claim 83, wherein said switching step sends information regarding a timing at which to switch over the communication frames to the communication device which is conducting communication using said second communication frame.

87. A program storage device according to claim 86, wherein the information regarding the timing at which to switch over the said communication frames is sent using a control channel for communicating control information.

88. A program storage device according to claim 83, wherein said receiving step receives said switch-over request using a control channel for communicating control information.

89. A program storage device according to claim 83, wherein said second communication frame is a portion of said first communication frame which has been allocated to communication with the third communication device.

90. A program storage according to claim 89, wherein said first communication frame is a communication frame which includes a non-real-time data channel for communicating non-real-time data and does not include a real-time data channel, and wherein said second communication frame is a communication frame which includes a real-time data channel for communicating real-time data and a non-real-time data channel for communicating non-real-time data.

* * * * *

UNITED STATES PATENT AND TRADEMARK OFFICE
CERTIFICATE OF CORRECTION

| | |
|---|---|
| PATENT NO. | : 6,038,225 |
| APPLICATION NO. | : 08/969063 |
| DATED | : March 14, 2000 |
| INVENTOR(S) | : Hidetada Nago |

It is certified that error appears in the above-identified patent and that said Letters Patent is hereby corrected as shown below:

[56] REFERENCES CITED

Foreign Patent Documents
    "8-163071 of 0000 Japan" should read
        --8-163071 6/1996 Japan--.

[56] EXAMINER

"Assistant Examiner - David R Vincent" should read
        --Assistant Examiner - David R. Vincent--.

COLUMN 1

Line 37, "is" should read --has--.

COLUMN 7

Line 35, "is" should read --has--.

COLUMN 9

Line 66, "device" should read --device and the second
        communication device--.

COLUMN 10

Line 57, "device" should read --device and the second
        communication device--.

COLUMN 13

Line 35, "device" should read --device and the second
        communication device--.

COLUMN 14

Line 29, "device" should read --device and the second
        communication device--.
    Line 57, "as" should read --has--.

UNITED STATES PATENT AND TRADEMARK OFFICE
CERTIFICATE OF CORRECTION

| | | |
|---|---|---|
| PATENT NO. | : 6,038,225 | |
| APPLICATION NO. | : 08/969063 | |
| DATED | : March 14, 2000 | |
| INVENTOR(S) | : Hidetada Nago | |

It is certified that error appears in the above-identified patent and that said Letters Patent is hereby corrected as shown below:

<u>COLUMN 16</u>

Line 26, "device" should read --device and the second
          communication device--.

Signed and Sealed this

Twenty-fourth Day of July, 2007

JON W. DUDAS
*Director of the United States Patent and Trademark Office*